United States Patent
Endo et al.

(10) Patent No.: US 7,956,133 B2
(45) Date of Patent: Jun. 7, 2011

(54) GAS-BARRIER MATERIAL AND A METHOD OF PRODUCING THE SAME

(75) Inventors: Aki Endo, Yokohama (JP); Hiroshi Sasaki, Yokohama (JP); Yusuke Obu, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 792 days.

(21) Appl. No.: 11/910,397

(22) PCT Filed: Mar. 30, 2006

(86) PCT No.: PCT/JP2006/307279
§ 371 (c)(1),
(2), (4) Date: Oct. 1, 2007

(87) PCT Pub. No.: WO2006/104257
PCT Pub. Date: Oct. 5, 2006

(65) Prior Publication Data
US 2009/0274918 A1  Nov. 5, 2009

(30) Foreign Application Priority Data

Mar. 30, 2005 (JP) ................. 2005-099730
Dec. 13, 2005 (JP) ................. 2005-358789

(51) Int. Cl.
*C08J 3/24* (2006.01)
*C08F 8/30* (2006.01)
*C08F 8/42* (2006.01)
*B32B 27/30* (2006.01)

(52) U.S. Cl. ............... 525/327.3; 525/328.7; 525/329.7; 525/329.9; 525/330.2; 525/360; 525/362; 525/363; 525/370; 525/371; 525/372; 525/373; 525/375; 525/379; 428/424.2; 428/451; 428/475.8; 428/476.3; 428/483; 428/500; 428/515

(58) Field of Classification Search ............... 525/327.3, 525/328.7, 329.7, 329.9, 330.2, 360, 362, 525/363, 370, 371, 372, 373, 375, 379; 428/424.2, 428/451, 475.8, 476.3, 483, 500, 515
See application file for complete search history.

(56) References Cited

U.S. PATENT DOCUMENTS

2002/0161110 A1 * 10/2002 Tanaka et al. ............... 525/54.1
2005/0131162 A1    6/2005 Tanaka et al.

FOREIGN PATENT DOCUMENTS

| JP | 2003-171468 |   * | 6/2003 |
| JP | 2003-171468 A |  | 6/2003 |
| JP | 2003-292713 A |  | 10/2003 |
| JP | 2004-115776 A |  | 4/2004 |
| JP | 2004-435586 A |  | 11/2004 |
| JP | 2005-81699 A |  | 3/2005 |
| WO | 03/091317 A1 |  | 11/2003 |
| WO | WO 2003/091317 | * | 11/2003 |

* cited by examiner

*Primary Examiner* — Roberto Rabago
(74) *Attorney, Agent, or Firm* — Sughrue Mion, PLLC

(57) ABSTRACT

A gas-barrier material in which carboxyl groups are ionically crosslinked in an amount corresponding to an acid value of at least 330 mgKOH/g of a resin that has the carboxyl groups in an amount corresponding to an acid value of not smaller than 580 mgKOH/g. The gas-barrier material exhibits excellent gas-barrier property, retort resistance and flexibility under highly humid conditions, enables the film to be cured at a low temperature in a short period of time, and can be favorably produced.

9 Claims, 2 Drawing Sheets

GAS-BARRIER MATERIAL AND A METHOD OF PRODUCING THE SAME

TECHNICAL FIELD

The present invention relates to a gas-barrier material. More specifically, the invention relates to a gas-barrier material having excellent gas-barrier property and water resisting property, and is capable of maintaining excellent gas-barrier property even after placed under high-temperature and wet conditions such as during the retort treatment.

BACKGROUND ART

Gas-barrier resins of a variety of kinds have heretofore been used as represented, particularly, by polyvinylidene chloride, polyacrylonitrile and ethylene/vinyl alcohol copolymer. However, use of the polyvinylidene chloride and polyacrylonitrile has been limited from the standpoint of their environmental problems while the ethylene/vinyl alcohol copolymer is accompanied by such a problem that the gas-barrier property thereof is much dependent upon the humidity and is subject to decrease under highly humid conditions.

As a method of imparting gas-barrier property to the packing materials, there has been known to use a film obtained by vacuum-evaporating an inorganic matter on the surface of a base material. However, the film of this kind is very expensive. Besides, the vacuum-evaporated film has a problem in regard to flexibility and poor adhesion to other resin layers.

To solve the above problems, there have been proposed a gas-barrier film obtained by forming, on a base material, a film which comprises high molecules A in the form of an aqueous solution, water-soluble or water-dispersing high molecules B and an inorganic layer compound (JP-A-9-151264), a gas-barrier film obtained by applying a layer containing a metal compound onto the surface of a layer of a formed article of a mixture of a polymer of the type of a poly(metha)acrylic acid and polyalcohols (JP-A-2000-931), and a gas-barrier coating material containing a polyvinyl alcohol, an ethylene/maleic acid copolymer and a metal compound having a valency of two or more (JP-A-2004-115776).

DISCLOSURE OF THE INVENTION

The gas-barrier materials disclosed in the above prior art documents exhibit improved gas-barrier properties under highly humid conditions but are not capable of meeting a multiplicity of requirements as packing materials, and are not, hence, still satisfactory to a sufficient degree.

That is, in the gas-barrier film disclosed in JP-A-9-151264, an inorganic compound in the form of a layer is simply dispersed in a film. To obtain excellent gas-barrier property, therefore, the inorganic compound in the form of a layer must be added in large amounts arousing a problem of a decrease in the mechanical strength and poor retort resistance.

The gas-barrier film disclosed in JP-A-2000-931 requires a heat treatment at a high temperature for an extended periods of time for curing the film. The gas-barrier coating material disclosed in JP-A-2004-115776, too, requires a heat treatment at a high temperature when the film is to be cured in a short period of time. Namely, these gas-barrier materials seriously affect the plastic base material and, besides, involve a problem from the standpoint of productivity.

In the gas-barrier materials disclosed in JP-A-2000-931 and JP-A-2004-115776, further, the gas-barrier properties are improved by utilizing the ionic crosslinking by metals. JP-A-2000-931 applies a layer that contains a metal compound. Here, however, the content of the metal is elementally analyzed by EDX (energy-dispersive X-ray spectroscopy), from which the amount of a metal element that is present can be learned. However, the amount of metal element that is really ionically crosslinking is not obvious. JP-A-2004-115776 discloses only the amount of the metal compound that is fed, from which the amount of metal element that is really ionically crosslinking is not obvious, either. As described above, there has yet been found neither the amount of ionic crosslinking necessary for imparting the gas-barrier property under the highly humid conditions nor the gas-barrier material having the amount of crosslinking.

It is therefore an object of the present invention to provide a gas-barrier material which is free from the above-mentioned problems, exhibits excellent gas-barrier property, retort resistance and flexibility, particularly, under highly humid conditions, enables the film to be cured at a low temperature in a short period of time, and can be favorably produced.

According to the present invention, there is provided a gas-barrier material in which carboxyl groups are ionically crosslinked in an amount corresponding to an acid value of at least 330 mgKOH/g of a resin that has the carboxyl groups in an amount corresponding to an acid value of not smaller than 580 mgKOH/g.

In the gas-barrier material of the present invention, it is desired that:

1. The carboxyl groups in the resin are crosslinked with polyvalent metal ions;
2. The resin comprises a copolymer of a carboxyl group-containing vinyl monomer (A) and a vinyl monomer (B) having functional groups which are capable of reacting with themselves or with the carboxyl groups, as essential components;
3. The functional groups in the vinyl monomer (B) react with themselves or with the carboxyl groups to form a crosslinked structure;
4. The vinyl monomer (B) has an aldehyde group or a glycidyl group;
5. The resin comprises a carboxyl group-containing polymer (C) and a compound (D) containing two ring structures (d) in which an ether bond is formed with carbon that forms a double bond with nitrogen, the ring structures (d) containing oxygen of the ether bond, wherein a crosslinked structure is formed by the reaction of the carboxyl groups of the carboxyl group-containing polymer (C) with the ring structures (d) of the compound (D);
6. At least one of the ring structures (d) contained in the compound (D) is an oxazoline group or a derivative thereof; and
7. The compound (D) is a 2,2'-bis(2-oxazoline).

According to the present invention, there is further provided a method of producing a gas-barrier material by treating a gas-barrier precursor of a resin that has carboxyl groups in an amount corresponding to an acid value of not smaller than 580 mgKOH/g with the water of a pH of 10 to 13 containing a polyvalent metal compound in an amount of 90 to 2000 mmols/L calculated as metal atoms at a temperature of not lower than 35° C. for not longer than 10 seconds thereby to form a metal ion-crosslinked structure among the unreacted carboxyl groups in an amount corresponding to an acid value of at least 330 mgKOH/g.

In the method of producing a gas-barrier material of the present invention, it is desired that the treatment is the one for immersing the gas-barrier precursor in the water containing a polyvalent metal.

According to the present invention, there is further provided a packing material having a layer of the gas-barrier material on the surfaces of a plastic base material or between the plastic layers.

The gas barrier material of the present invention exhibits excellent gas-barrier property under the highly humid conditions, i.e., exhibits gas-barrier property which is so excellent that the amount of oxygen permeation is not larger than 20 $cc/m^2/day/atm$ under a highly humid condition of a relative humidity of 80%.

Further, the present invention clarifies the amount of ionic crosslinking necessary for imparting the gas-barrier property under a highly humid condition, and makes it possible to reliably impart excellent gas-barrier property to the gas-barrier material under the highly humid condition.

It is further made possible to obtain particularly excellent gas barrier property and retort resistance by using a gas-barrier resin which comprises a copolymer of a carboxyl group-containing vinyl monomer (A) and a vinyl monomer (B) having functional groups which are capable of reacting with themselves or with the carboxyl groups, as essential components, or by using a gas-barrier resin which comprises a carboxyl group-containing polymer (C) and a compound (D) containing two ring structures (d) in which an ether bond is formed with carbon that forms a double bond with nitrogen, the ring structures (d) containing oxygen of the ether bond, and a crosslinked structure is formed by the reaction of the carboxyl groups of the carboxyl group-containing polymer (C) with the ring structures (d) of the compound (D).

In the gas-barrier material of the present invention, it is important that the carboxyl groups are ionically crosslinked in an amount corresponding to an acid value of at least 330 mgKOH/g of a resin that has the carboxyl groups in an amount corresponding to an acid value of not smaller than 580 mgKOH/g. This makes it possible to exhibit excellent gas-barrier property even under highly humid conditions.

That is, the resin having carboxyl groups in an amount corresponding to an acid value of not smaller than 580 mgKOH/g exhibits excellent gas-barrier property under lowly humid conditions but exhibits decreased gas-barrier property under highly humid conditions due to the presence of unreacted free carboxyl groups in the resin.

According to the present invention, the carboxyl groups are ionically crosslinked in an amount corresponding to an acid value of at least 330 mgKOH/g of the resin that contains the carboxyl groups in an amount corresponding to an acid value of not smaller than 580 mgKOH/g, making it possible to obtain strikingly improved water resisting property without decreasing the gas-barrier property even under highly humid conditions, i.e., to obtain excellent gas-barrier property and retort resistance.

The acid value of the resin having carboxyl groups and the amount of carboxyl groups to be ionically crosslinked in the gas-barrier material of the present invention create a critical meaning concerning the gas-barrier property under highly humid conditions as will also become obvious from the results of Examples that will be described later.

That is, even a resin having carboxyl groups in an amount corresponding to an acid value of not smaller than 580 mgKOH/g permits oxygen to permeate through in large amounts, and exhibits poor gas-barrier property under a highly humid condition (80% RH) as shown in Table 1. However, the gas-barrier material of the invention in which the carboxyl groups are ionically crosslinked in an amount corresponding to not smaller than 330 mgKOH/g permits oxygen to permeate through under a highly humid condition (80% RH) in an amount that is strikingly decreased before and after the ionic crosslinking, exhibiting a distinctly improved gas-barrier property under highly humid conditions (Examples 1 to 18).

On the other hand, when the acid value of the resin is not larger than 580 mgKOH/g, the gas-barrier property is not improved under the highly humid condition (80% RH) despite the carboxyl groups are ionically crosslinked in an amount corresponding to acid value of 516 mg/KOH/g (Comparative Example 1).

Further, even when the acid value of the carboxyl group-containing resin is not smaller than 580 mgKOH/g, there is no much change in the amount of oxygen permeation before and after the ionic crosslinking if the carboxyl groups are ionically crosslinked in an amount corresponding to an acid value of not larger than 330 mgKOH/g, and the gas-barrier property is not improved by the ionic crosslinking under highly humid conditions (Comparative Examples 2 and 3). Further, when a metal compound is added to a coating solution but the immersion treatment is not effected, the ionic crosslinking is not formed and the gas-barrier property is not obtained despite the metal element is present in the gas-barrier material (Comparative Example 4). It is therefore obvious that the amount of feeding metal elements and the amount thereof that is present are not enough to clarify the gas-barrier property, and the amount of the carboxyl groups that are really crosslinked gives an important meaning.

Further, when the above gas-barrier material is laminated on the other plastic film to obtain a laminated body, the apparent gas-barrier property increases before the ionic crosslinking accounting for a increase in the gas-barrier property before and after the ionic crosslinking. It is, however, obvious that the gas-barrier property is improved owing to the ionic crosslinking (Examples 17 and 18).

In ionically crosslinking the resin having carboxyl groups in an amount corresponding to an acid value of not smaller than 580 mgKOH/g according to the invention, further, a gas-barrier precursor of a resin that has carboxyl groups in an amount corresponding to an acid value of not smaller than 580 mgKOH/g is treated with the water of a pH of 10 to 13 containing a polyvalent metal compound in an amount of 90 to 2000 mmols/L calculated as metal atoms at a temperature of not lower than 35° C., making it possible to ionically crosslink the carboxyl groups in an amount corresponding to not smaller than 330 mg/KOH in a period of time which is as short as 10 seconds or less. This will become obvious from the results of Examples appearing later.

That is, in Examples 12 to 16 in which the concentrations of metal ions in the treating water, pH and temperatures lie within the above-mentioned ranges, the carboxyl groups can be ionically crosslinked in amounts corresponding to acid values comparable to those of Examples 1 to 11 in which the treating times are longer than 8 hours, and the ionic crosslinking can be effected in desired amounts maintaining very good efficiency. According to this method of production, therefore, the gas-barrier material can be produced maintaining good productivity.

BEST MODE FOR CARRYING OUT THE INVENTION

Figure 1:
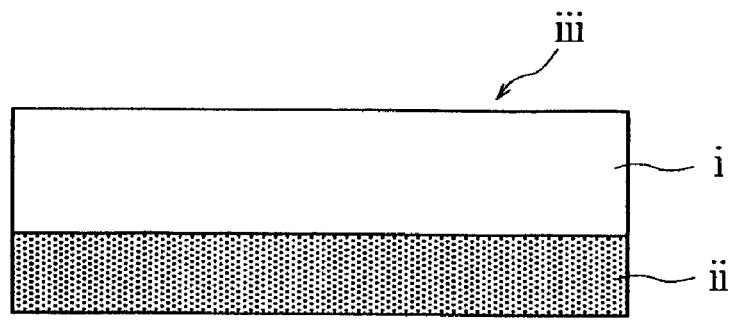
FIG. 1 is a view illustrating, in cross section, the structure of a gas-barrier material produced in Example 1.

Resins Having Carboxyl Groups in Amounts Corresponding to an Acid Value of not Smaller than 580 mgKOH/g)

In the gas-barrier material of the present invention, the gas-barrier performance is determined by a combination of an acid value of a resin that is used and an acid value that has took part in the ionic crosslinking. Therefore, it is important that the resin used in the present invention has carboxyl groups in an amount corresponding to an acid value of not smaller than 580 mgKOH/g and that the carboxyl groups therein are ionically crosslinked in an amount corresponding to at least not smaller than 330 mgKOH/g.

To obtain more excellent gas-barrier performance for use in a field where more strict gas-barrier performance is required, it is desired that the resin has an acid value of not smaller than 650 mgKOH/g and that the carboxyl groups therein are ionically crosslinked in an amount corresponding to at least not smaller than 400 mgKOH/g. In particular, it is most desired that the resin has an acid value of 650 to 950 mgKOH/g and that the carboxyl groups therein are ionically crosslinked in an amount corresponding to at least not smaller than 500 mgKOH/g.

When the resin has the carboxyl groups in an amount corresponding to an acid value of not smaller than 580 mgKOH/g, the gas-barrier material of the present invention exhibits strikingly improved gas-barrier property under highly humid conditions irrespective of the kind of the resin so far as the carboxyl groups are ionically crosslinked in an amount corresponding to an acid value of at least 330 mgKOH/g. Particularly preferably, the resin containing the carboxyl groups in an amount corresponding to an acid value of not smaller than 580 mgKOH/g comprises:

1. a copolymer of a carboxyl group-containing vinyl monomer (A) and a vinyl monomer (B) having functional groups which are capable of reacting with themselves or with the carboxyl groups, as essential components, the functional groups in the vinyl monomer (B) reacting with themselves or with the carboxyl groups to form a crosslinked structure; or
2. a carboxyl group-containing polymer (C) and a compound (D) containing two ring structures (d) in which an ether bond is formed with carbon that forms a double bond with nitrogen, the ring structures (d) containing oxygen of the ether bond, and a crosslinked structure is formed by the reaction of the carboxyl groups of the carboxyl group-containing polymer (C) with the ring structures (d) of the compound (D).

That is, the above copolymer is the high hydrogen-bonding copolymer having a high degree of hydrogen bond and exhibits favorable gas-barrier property. Besides, the high hydrogen-bonding copolymer obtained by copolymerizing the vinyl monomers (A) and (B), has functional groups rich in reactivity stemming from the vinyl monomer (B), the functional groups being in a free state therein. With the free functional groups present in the copolymer as crosslinking points, the high hydrogen-bonding copolymer can be crosslinked without impairing a high degree of hydrogen bonding, and there is imparted gas-barrier property that withstands the conditions of humidity which is high to a certain degree.

Besides, the above polymer (C) is a high hydrogen-bonding polymer having a high degree of hydrogen bonding and is capable of exhibiting good gas-barrier property. Through the reaction of the carboxyl groups in the polymer (C) with the ring structures (d) of the above compound (D), a crosslinked structure can be formed among the polymer chains of the polymer (C) without impairing a high degree of hydrogen bonding. Besides, the crosslinked portions that are formed comprise amido ester bonds which are structures effective in exhibiting gas-barrier property. Thus, there is exhibited gas-barrier property that can withstand the conditions of humidity which is high to a certain degree.

In the present invention, the remaining unreacted free carboxyl groups of the gas-barrier resin forming the crosslinked structure due to covalent bond, are ionically crosslinked to improve the water resisting property to exhibit more excellent gas-barrier property to a conspicuous degree under highly humid conditions as well as to exhibit excellent retort resistance.

The gas-barrier resins will now be described. (Gas-barrier resin of a carboxyl group-containing vinyl monomer (A) and a vinyl monomer (B))

[Carboxyl Group-Containing Vinyl Monomer (A)]

As the carboxyl group-containing vinyl monomer (A), though not limited thereto only, there can be exemplified mono- or di-carboxylic acid monomers such as acrylic acid, methacrylic acid, itaconic acid, maleic acid, maleic anhydride, crotonic acid and fumaric acid.

[Vinyl Monomer (B)]

It is desired that the vinyl monomer (B) having functional groups capable of reacting with themselves or with carboxyl groups is the one having reactive functional groups such as aldehyde groups or glycidyl groups. Though not limited thereto only, there can be preferably used acrolein (acrylaldehyde), metacrolein (metacrylaldehyde), glycidyl acrylate and glycidyl methacrylate.

In the copolymer of the vinyl monomer (A) and the vinyl monomer (B) constituting the gas-barrier resin, that can be preferably used in the present invention, it is desired that the composition ratio (mol %) of the vinyl polymer (A) and the vinyl monomer (B) in the copolymer is A:B=70:30 to 98:2 and, particularly, 75:25 to 95:5. When the amount of the vinyl monomer (A) is smaller than the above range, it becomes difficult to maintain the acid value of the resin to be not smaller than 580 mgKOH/g often making it difficult to impart excellent gas-barrier property relying upon the ionic crosslinking to a sufficient degree under highly humid conditions. When the amount of the vinyl monomer (A) is larger than the above range, on the other hand, there results a decrease in the amount of the reactive functional groups stemming from the vinyl monomer (B), that serve as crosslinking points for crossing the copolymers. Therefore, a strong crosslinking structure cannot be formed, and the retort resistance becomes inferior.

In the present invention, it is desired that the free functional groups stemming from the vinyl monomer (B), that serve as crosslinking points in the copolymer, are present at a ratio of at least not smaller than 30% and, particularly, 50 to 100% of the functional groups stemming from the vinyl monomer (B) in the copolymer. This enables the copolymer to be easily crosslinked and, hence, to impart excellent gas-barrier property and retort resistance.

Though there is no particular limitation on the method of polymerizing the gas-barrier resin, it is desired the gas-barrier resin is radically polymerized. The type of polymerization is, desirably, the solution polymerization, particularly desirably, by using a non-aqueous solvent as a polymerization solvent.

That is, in the above gas-barrier resin, it is desired that the obtained copolymers are crosslinked from the standpoint of improving gas-barrier property. For this purpose, it is desired that the copolymers have free functional groups such as aldehyde groups that serve as crosslinking points. When an aqueous solvent is used, the free aldehyde groups in the copolymer undergo the hydration reaction with the water. Therefore, the crosslinking points decreases and the gas-barrier property becomes inferior.

As the polymerization solvent, there can be exemplified methyl alcohol, ethyl alcohol, isopropyl alcohol, acetone, tetrahydrofurane, N,N-dimethylformamide, ethyl acetate and toluene. In the present invention, in particular, there is preferably used a mixed solvent of an alcohol and a cyclic ether and, particularly, a mixed solvent of an isopropyl alcohol and a tetrahydrofurane. It is desired that the blending ratio of the alcohol and the cyclic ether in the mixed solvent is in a range of 3:97 to 20:80 and, particularly, 5:95 to 10:90 on the weight basis. When the amount of alcohol is smaller than the above range, the polymerization efficiency becomes poor. When the amount of alcohol is greater than the above range, on the other hand, the retort resistance of the obtained copolymer may be impaired.

As the polymerization initiator used for polymerizing the copolymer, there can be used widely known radical polymerization initiators which are peroxides, such as benzoyl peroxide, cumene hydroperoxide, tert-butyl peroxide, diisopropyl peroxycarbonate, di-tert-butyl peroxide, and tert-butyl peroxybenzoate; inorganic peroxides, such as potassium persulfate, sodium persulfate and ammmonium persulfate; and azo compounds, such as 2,2-azobisisobutylonitrile, 2,2-azobis(2-methylpropionamidine)dihydrochloride, and 4,4-azobis(4-cyanopentanoic acid). Among them, the azo compound can be preferably used.

Though there is no particular limitation, the radical initiator is usually blended in an amount in a range of 0.005 to 0.1 mol % per the total amount of the vinyl monomers (A) and (B).

It is desired that the polymerization temperature is in a range of 20 to 70° C. and, particularly, 25 to 55° C. When the polymerization temperature is lower than the above range, the polymerization rate becomes low and when the polymerization temperature is higher than the above range, gelling takes place, which are not desirable. The polymerization time varies depending upon the composition of the vinyl monomers (A) and (B) and upon the amount of feeding. Generally, however, the polymerization time is desirably in a range of 0.5 to 144 hours and, particularly, 2 to 48 hours.

It is desired that the gas-barrier resin preferably used in the present invention has a number average molecular weight of 5,000 to 150,000 and, particularly, 10,000 to 100,000.

(Gas-Barrier Resin of a Carboxyl Group-Containing Polymer (C) and a Compound (D))

The gas-barrier material of the present invention favorably uses a gas-barrier resin which comprises a carboxyl group-containing polymer (C) and a compound (D) containing two ring structures (d) in which an ether bond is formed with carbon that forms a double bond with nitrogen, the ring structures (d) containing oxygen of the ether bond, wherein a crosslinked structure is formed by the reaction of the carboxyl groups of the carboxyl group-containing polymer (C) with the ring structures (d) of the compound (D).

That is, there is formed a crosslinked film in which, as represented by the following formula (1), carboxyl groups in the carboxyl group-containing polymer (C) react with the ring structures (d) of the compound (D) to form an amido ester, and two amido ester bonds are formed at the crosslinked portion, imparting excellent gas-barrier property.

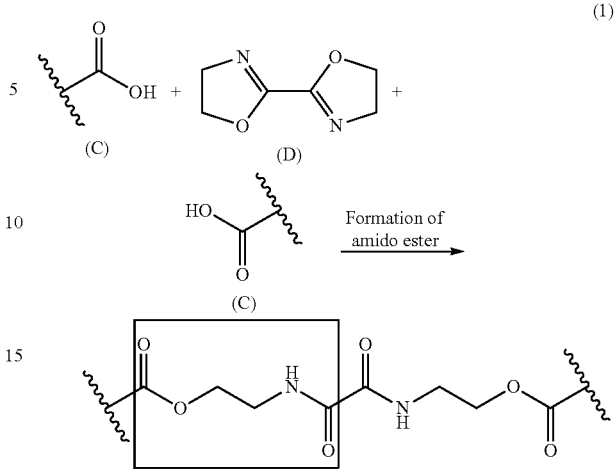

Described below are the reasons why the above gas-barrier resin exhibits excellent gas-barrier property.

i) The polymer which is a main component is a carboxyl group-containing polymer. Therefore, the carboxyl groups on the side chain possess a high hydrogen-bonding property and produce a strong cohesive force making it possible to form a basic structure having excellent gas-barrier property.

ii) An amido ester bond which is a structure effective in imparting gas-barrier property is formed by the reaction of the carboxyl groups on the polymer side chain with the ring structures (d) of the compound (D) which is a crosslinking component.

iii) The ring structures (d) are formed in a number of two which is a minimum number necessary for forming crosslinking. Therefore, the structure of the crosslinking point does not easily expand in a three-dimensional manner, and there is formed a tight crosslinked structure exhibiting excellent gas-barrier property.

iv) Use of the carboxyl group-containing polymer as a chief component makes it possible to metal ionically crosslink the unreacted carboxyl groups that were not used for the crosslinking, to further improve gas-barrier property under highly humid conditions and to impart excellent gas-barrier property that is not impaired even under highly humid conditions.

Further, the carboxyl group-containing polymer (C) is crosslinked with the compound (D) by the heating of a low temperature for a short period of time little affecting the plastic base material on which the gas-barrier material is to be formed, and contributes to excellent productivity, which are advantages.

[Carboxyl Group-Containing Polymer (C)]

As the carboxyl group-containing polymer (C), though not limited thereto only, there can be exemplified homopolymers or copolymers of monomers having carboxyl groups, such as of polyacrylic acid, polymethacrylic acid, polymaleic acid, polyitaconic acid, and acrylic acid/methacrylic acid copolymer, or partly neutralized products thereof. Desirably, there is used polyacrylic acid or polymethacrylic acid. Partly neutralized products of polycarboxylic acid polymer can be partly neutralized with a metal hydroxide such as sodium hydroxide or potassium hydroxide, or with ammonia. Though not particularly limited, it is desired that the degree of neutralization of the partly neutralized product is not larger than 30% in terms of a molar ratio to the carboxyl groups. When the degree of neutralization is greater than the above range, hydrogen-bonding property of the carboxyl groups decreases and the gas-barrier property decreases. Though there is no particular limitation, it is desired that the polycarboxylic acid polymer has a weight average molecular weight in a range of 5,000 to 1,500,000 and, particularly, 10,000 to 1,000,000.

[Compound (D)]

The compound (D) used as a crosslinking agent for crosslinking the carboxyl group-containing polymer (C) forms an ether bond with carbon that forms a double bond with nitrogen, and has two ring structures (d) that contains oxygen of the ether bond, i.e., has two ring structures having a group —N═C—O— or an exoimino group with a portion ═C—O— in the ring. As the ring structures (d), though not limited thereto only, the following ring structures can be exemplified.

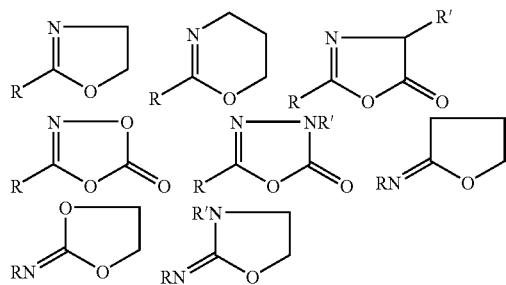

With the ring structure without oxygen of the ether bond as represented by the following formula (2), there takes place no crosslinking reaction for forming the amido ester bond with the polycarboxylic acid polymer. Further, a single ring structure cannot create crosslinking. Three or more ring structures cause the structure of the crosslinking point to expand in a three-dimensional manner making it difficult to form a tight crosslinking structure which exhibits excellent gas-barrier property, and are not desirable. From the above, it is important that nitrogen and carbon are forming a double bond, carbon is forming an ether bond, an ether bond is formed with carbon which forms a double bond with nitrogen, and that not only these conditions are individually existing but also there are contained two ring structures (d) forming an ether bond with carbon that is forming a double bond with nitrogen, the ring structures (d) containing oxygen of the ether bond.

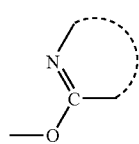

(2)

The compound (D) used as the gas-barrier material of the present invention has the above-mentioned ring structures (d) in a number of two. The two ring structures may be of the same structure or may be of different structures. Desirably, however, at least one of them is an oxazoline group or a derivative thereof.

As the compound (D) having two such ring structures (d), though not limited thereto only, there can be exemplified bisoxazolines, such as 2,2'-bis(2-oxazoline), 2,2'-bis(4-methyl-2-oxazoline), 2,2'-bis(5-methyl-2-oxazoline), 2,2'-bis(5,5'-dimethyl-2-oxazoline), 2,2'-bis(4,4,4',4'-tetramethyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4-dimethyl-2-oxazoline), 2,2'-m-phenylenebis(4-methyl-2-oxazoline), 2,2'-m-phenylenebis (4,4'-dimethyl-2-oxazoline), 2,2'-ethylenebis(2-oxazoline), 2,2'-tetramethylenebis(2-oxazoline), 2,2'-hexamethylenebis (2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4-dimethyl-2-oxazoline), 2,2'-3,3'-diphenoxyethanebis(2-oxazoline), 2,2'-cyclohexylenebis(2-oxazoline), and 2,2'-diphenylenebis(2-oxazoline); and bisoxazines, such as 2,2'-methylenebis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis(5,6-dihydro-4H-1,3-oxazine), 2,2'-hexamethylenebis(5,6-dihydro-4H-1,3-oxazine), 2,2'-p-phenylenebis(5,6-dihydro-4H-1,3-oxazine), 2,2'-m-phenylenebis(5,6-dihydro-4H-1,3-oxazine), 2,2'-naphthylenebis(5,6-dihydro-4H-1,3-oxazine), and 2,2'-p·p'-diphenylenebis(5,6-dihydro-4H-1,3-oxazine).

From the standpoint of mechanical properties and coloring in the present invention, it is desired that a crosslinked portion formed by the carboxyl group-containing polymer (C) and the compound (D) is the one formed by an aliphatic chain. Of the compound (D), therefore, it is desired to use the one without aromatic ring. In particular, it is desired to use a 2,2'-bis(2-oxazoline).

(Gas-Barrier Material)

The gas-barrier of the present invention is obtained by forming:

(i) a gas-barrier precursor of a single layer by applying a coating solution comprising a resin having carboxyl groups in an amount corresponding to an acid value of not smaller than 580 mgKOH/g onto a base material followed by heating to form a crosslinked structure, and removing the layer from the base material;

(ii) a gas-barrier precursor of a multiplicity of layers by applying a coating solution comprising a resin having carboxyl groups in an amount corresponding to an acid value of not smaller than 580 mgKOH/g onto a plastic base material followed by heating to form a crosslinked structure; or (iii) a gas-barrier precursor by forming a resin having carboxyl groups in an amount corresponding to an acid value of not smaller than 580 mgKOH/g directly into a sheet or a film followed by heating to form a crosslinked structure;

and by ionically crosslinking the thus obtained gas-barrier precursor. In particular, it is desired to form a gas-barrier precursor by using a coating solution.

In the gas-barrier material of the present invention, when the gas-barrier resin of the carboxyl group-containing vinyl monomer (A) and the vinyl monomer (B) is to be used as a coating solution, the gas-barrier resin obtained by the solution polymerization of the carboxyl group-containing vinyl monomer (A) and the vinyl monomer (B) is dissolved or dispersed in a solvent and, as required, is blended with an acid catalyst or an inorganic dispersant to prepare a coating solution.

It is desired that the gas-barrier resin is contained in the coating solution at a solid component concentration of 3 to 80% by weight and, particularly, 5 to 50% by weight. When the solid component concentration is smaller than the above range, it becomes difficult to form a film maintaining a required thickness and, besides, gas-barrier property cannot often be imparted to a sufficient degree. When the solid component concentration is greater than the above range, on the other hand, the viscosity of the coating solution becomes too high to hinder the coating work.

It is desired that the coating solution contains an acid catalyst for accelerating the reaction among the functional groups in the vinyl monomer (B) which is a starting monomer of the gas-barrier resin or the reaction of the functional groups with the carboxyl groups. This makes it possible to efficiently introduce, into the film, the crosslinked structure specific to the gas-barrier resin of the present invention described above.

As the acid catalyst for accelerating the reaction among the functional groups in the vinyl monomer (B) or the reaction of the functional groups with the carboxyl groups, there can be exemplified monovalent acids such as acetic acid, propionic acid, ascorbic acid, benzoic acid, hydrochloric acid, paratoluenesulfonic acid, and alkylbenzenesulfonic acid, and divalent or more highly valent acids such as sulfuric acid, sulfurous acid, phosphoric acid, phosphorus acid, hypophosphorus acid, polyphosphoric acid, pyrophosphoric acid, maleic acid, itaconic acid, fumaric acid and polycarboxylic acid. Particularly, a monohydric acid is preferred and, concretely, a paratoluenesulfonic acid is preferred.

It is desired to use the acid catalyst in a range of 1 to 100 mmols and, particularly, 2.5 to 80 mmols per 100 g of the gas-barrier resin in the coating solution. When the acid catalyst has a valency of two or more, it is desired to use the catalyst in an amount found by dividing the above range by the valency n thereof.

The acid catalyst accelerates the reaction among the functional groups of the vinyl monomer (B) or the reaction of the functional groups with the carboxyl groups. By taking the preservation stability (viscosity) of the coating solution into consideration, therefore, it is desired that the coating solution is mixed with other component just before being applied onto the base material.

In addition to being blended with the above inorganic dispersant for improving the gas-barrier property, the coating solution may, as required, be blended with known blending agents such as surfactant, filler, coloring agent or additive according to a conventional recipe.

When a resin of the carboxyl group-containing polymer (C) and the compound (D) is used for the gas-barrier material of the present invention, a coating solution containing the compound (D) in an amount of 2 to 60 parts by weight and, particularly, 4 to 40 parts by weight per 100 parts by weight of the carboxyl group-containing polymer (C) is heated at a temperature of 110 to 170° C. for 5 seconds to 5 minutes depending upon the kinds of the carboxyl group-containing polymer (C) and the compound (D) or upon the amount of applying the coating solution, thereby to prepare a gas-barrier precursor that is to be subjected to the ionic crosslinking.

The coating solution can be prepared by dissolving the components of carboxyl group-containing polymer (C) and compound (D) in water, or by mixing the water solutions of these components. There can be further used a solvent such as an alcohol or a mixed solvent such as water/alcohol in addition to using the water.

The above-mentioned acid catalyst may be added to accelerate the reaction of the carboxyl groups of the carboxyl group-containing polymer (C) with the ring structures (d) of the compound (D). In addition to blending the above-mentioned inorganic dispersant for improving gas-barrier property, there may, as required, be further blended widely known blending agents, such as surfactant, filler, coloring agent and additives according to the known recipe.

The coating solution can be applied to the base material by a method of immersing the base material in the coating solution, by a method of slush coating, spin coating, roll coating or spray coating. Though generally not necessary, the coating solution can be applied to the base material, as required, being divided into two or more times. Further, when the plastic base material does not have wettability or has little wettability to the coating solution, the surface of the plastic base material to be applied with the coating solution may be subjected to the corona discharge treatment, ozone treatment, treatment with the irradiation of ultraviolet rays of short wavelengths or treatment with flame.

The coating solution of the present invention can be dried and crosslinked by the heat treatment at a temperature of 100 to 200° C. and, particularly, 110 to 170° C. for a period of time which is as short as 0 second to 30 minutes and, particularly, 5 seconds to 5 minutes depending upon the amount of applying the coating solution. Therefore, the base material is little affected by the heating of the film and excellent productivity is accomplished.

There is no particular limitation on the heating system; i.e., the heat treatment may be conducted in a dry atmosphere such as in an oven, or by the contact with a heating roll. Prior to the heat treatment, further, the solvent may be evaporated by blowing the hot air using a dryer or by the irradiation with infrared rays thereby to form a dry film and, thereafter, the heat treatment is conducted. After the solvent is evaporated from the film by drying, further, the film may be exposed to a hot atmosphere of a temperature in a range of 70 to 140° C. for 10 seconds to 7 days.

(Ionic Crosslinking)

The gas-barrier material of the present invention can be obtained by ionically crosslinking the carboxyl groups in an amount corresponding to an acid value of at least 330 mgKOH/g among the unreacted carboxyl groups remaining in the gas-barrier precursor thus formed.

To ionically crosslink the carboxyl groups in the gas-barrier resin in the present invention, there may be used a crosslinking agent having cationic polar groups, such as primary, secondary or tertiary amino groups, or a cationic monomer having quaternary organic ammonium groups or amido groups. Preferably, however, the carboxyl groups are metal-ionically crosslinked by using a polyvalent metal compound.

As the polyvalent metal compound for metal-ionically crosslinking the gas-barrier material of the present invention, there is used a divalent or more highly valent metal compound that can be contained in the water and that can be crosslinked with the carboxyl groups.

As the polyvalent metal ions, there is no particular limitation so far as they are capable of crosslinking the carboxyl groups possessed by the resin. There can be used metal ions having a valency of two or more (particularly, a valency of 2 to 3) and, preferably, divalent metal ions, such as magnesium ions $Mg^{2+}$ or calcium ions $Ca^{2+}$.

As the metal ions, there can be exemplified alkaline earth metals (magnesium Mg, calcium Ca, strontium Sr, barium Ba, etc.), metals of the Group 8 of periodic table (iron Fe, ruthenium Ru, etc.), metals of the Group 11 of periodic table (copper Cu, etc.), metals of the Group 12 of periodic table (zinc Zn, etc.), and metals of the Group 13 of periodic table (aluminum Al, etc.). As the divalent metal ions, there can be exemplified such ions as magnesium ions $Mg^{2+}$, calcium ions $Ca^{2+}$, strontium ions $Sr^{2+}$, barium ions $Ba^{2+}$, copper ions $Cu^{2+}$, and zinc ions $Zn^{2+}$. As the trivalent metal ions, there can be exemplified such ions as aluminum ions $Al^{3+}$ and iron ions $Fe^{3+}$. The metal ions can be used in one, two or more kinds in combination. As the hydrolyzing metal compound which is a source of polyvalent metal ions, there can be exemplified metal salts constituting the above metal ions, such as halogen compounds (e.g., chlorides like magnesium chloride, calcium chloride), hydroxides (e.g., magnesium hydroxide, calcium hydroxide), oxides (e.g., magnesium oxide, calcium oxide), carbonates (e.g., magnesium carbonate, calcium carbonate), inorganic acid salts such as perhalogenates (e.g., perchlorates like magnesium perchlorate, calcium perchlorate), sulfates (e.g., magnesium sulfate, calsium sulfate), sulfites, nitrates (e.g., magnesium nitrate, calcium nitrate), hypophosphites, phosphites, phosphates (e.g., magnesium phosphate, calcium phosphate), and organic acid salts such as carboxylates (e.g., acetates like magnesium acetate, calcium acetate). These metal compounds can be used alone or in a combination of two or more kinds. Among these compounds, it is desired to use halides and hydroxides of the above metals.

The gas-barrier precursor is ionically crosslinked with a polyvalent metal compound; i.e., the gas-barrier precursor is treated with the water containing the polyvalent metal compound to easily form an ionically crosslinked structure.

As the treatment with the water containing the polyvalent metal compound, there can be exemplified:
(i) Immersing the gas-barrier precursor in the water containing the polyvalent metal compound;
(ii) Spraying the water containing the polyvalent metal compound onto the gas-barrier precursor;
(iii) Treatment with the atmosphere by placing the gas-barrier precursor under a highly humid condition after the treatment of (i) or (ii) above; and
(iv) Retort treatment with the water containing the polyvalent metal compound (desirably, a method of bringing the packaging material into direct contact with the hot water).

The above treatment (iii) is for bringing about the aging affect after the above treatment (i) or (ii), and helps shorten the time of the processing (i) or (ii).

The water for treatment used in the above processings (i) to (iii) may be the cold water. In order for the water containing the polyvalent metal compound to easily act upon the gas-barrier precursor, however, the temperature of the water containing the polyhydric metal compound is elevated to be not lower than 20° C., preferably, not lower than 35° C. and, particularly, 40 to 100° C. When the treatment can be conducted for a period of time that is long to some extent and under mild conditions, the treatment is desirably conducted for not shorter than 3 seconds and, particularly, for about 10 seconds to about 4 days in the case of (i) and (ii). In the case of (iii), it is desired that the treatment of (i) or (ii) is conducted for not shorter than 0.5 seconds and, particularly, for about one second to about one hour, followed by the treatment with an atmosphere by placing the gas-barrier precursor under a highly humid condition for not shorter than one hour and, particularly, for about two hours to about 14 days.

In the case of the above treatment (iv), the treatment is conducted at a temperature of not lower than 101° C. and, particularly, at 120 to 140° C. for not shorter than one second and, particularly, for about 3 seconds to about 120 minutes.

Further, the gas-barrier precursor formed from the coating solution in which the polyvalent metal compound has been dissolved or dispersed in advance, may similarly be treated with the water or the water containing the polyvalent metal compound.

In either case, it is desired that the polyvalent metal compound is contained in the water in not less than 0.125 mmols/L, more preferably, not less than 0.5 mmols/L and, further preferably not less than 2.5 mmols/L calculated as metal atoms. The higher the concentration of the polyvalent metal compound, the better it is.

In any treatment, it is desired that the water containing the polyvalent metal compound is neutral to alkaline.

When a high-speed productivity is required on an industrial scale in the present invention, in particular, the gas-barrier precursor comprising the resin having carboxyl groups in an amount corresponding to an acid value of not smaller than 580 mgKHO/g, is treated in the water of a pH of 10 to 13, preferably 11 to 12.7, containing the polyvalent metal compound in an amount of 90 to 2000 mmols/L, preferably 100 to 1500 mmols/L, calculated as metal atoms at a temperature of not lower than 35° C., preferably, not lower than 40° C., in order to form metal-ionically crosslinked structure among the unreacted carboxyl groups in an amount corresponding to an acid value of not smaller than 330 mgKOH/g within a period of time which is as short as 10 seconds or less and, particularly, 1 to 5 seconds, making it possible to greatly increase the productivity.

When the polyvalent metal compound is smaller than 90 mmols/L calculated as metal atoms, the concentration is so low that it becomes difficult to form metal-ionically crosslinked structure in a predetermined amount within the above short period of time. When the polyvalent metal compound is not smaller than 2000 mmols/L, the concentration thereof is so high that the ions are rather less dispersed into the gas-barrier precursor making it difficult to conduct the treatment within the above short period of time, either. When the water has a pH which is smaller than 10, the degree of dissociation of free carboxyl groups in the gas-barrier precursor is not large enough when the water has permeated through, and it becomes difficult to form a metal-ionically crosslinked structure among the carboxyl groups within the above short period of time. When the pH is larger than 13, on the other hand, an increased load is exerted on the base material used as the gas-barrier precursor or used for the coating.

Of the above treatments (i) to (iii), the immersion treatment for immersing the gas-barrier precursor in the water containing the polyvalent metal is desirable since it is capable of effecting the crosslinking within the shortest period of time.

The gas-barrier material of the present invention may contain an inorganic dispersant in addition to the resin containing the carboxyl groups in an amount corresponding to an acid value of not smaller than 580 mgKOH/g. The inorganic dispersant works to block the water content from the outer side, protects the gas-barrier resin and, further, improves the gas-barrier property and water resisting property.

The inorganic dispersant may have any shape such as spherical shape, needle-like shape or layer-like shape, but should have wettability to the gas-barrier resin and should be favorably dispersed in the coating solution. From the standpoint of blocking the water content, in particular, there is preferably used a silicate compound having a layer-like crystal structure, such as water-swelling mica or clay. Desirably, the inorganic dispersant has an aspect ratio of not smaller than 30 but not larger than 5000 from the standpoint of being dispersed like a layer to block the water content.

It is desired that the inorganic dispersant is contained in an amount of 5 to 100 parts by weight per 100 parts by weight of the resin having carboxyl groups in an amount corresponding to an acid value of not smaller than 580 mgKOH/g.

As described above, the packing material having a layer of a gas-barrier material of the present invention may be of a single layer of the gas-barrier material obtained by ionically crosslinking the resin having carboxyl groups in an amount corresponding to an acid value of not smaller than 580 mgKOH/g, or may be the one obtained by forming the gas-barrier member on the surface of the plastic base material or between the plastic layers.

The packing material can be obtained by forming a gas-barrier material on the plastic base material of any shape such as a film, a sheet, a bottle, a cup, a tray or a can produced from a thermally formable thermoplastic resin by such means as extrusion forming, injection forming, blow forming, draw-blow forming or press forming.

Suitable examples of the resin constituting the plastic base material include olefinic copolymers such as low-, intermediate- or high-density polyethylene, linear low-density polyethylene, polypropylene, ethylene/propylene copolymer, ethylene/butene copolymer, ionomer, ethylene/vinyl acetate copolymer and ethylene/vinyl alcohol copolymer; polyesters such as polyethylene terephthalate, polybutylene terephthalate, polyethylene terephthalate/isophthalate and polyethylene naphthalate; polyamides such as nylon 6, nylon 6,6, nylon 6,10 and metaxylylene adipamide; styrene copolymers such as polystyrene, styrene/butadiene block copolymer, styrene/acrylonitrile copolymer and styrene/butadiene/acrylonitrile copolymer (ABS resin); vinyl chloride copolymers such as polyvinyl chloride, and vinyl chloride/vinyl acetate copolymer; acrylic copolymers such as polymethyl methacrylate, methyl methacrylate/ethyl acrylate copolymer; and polycarbonate.

These thermoplastic resins may be used in a single kind or in the form of a blend of two or more kinds. Further, the plastic base material may be of a single-layer constitution or a laminated-layer constitution of two or more layers obtained by co-melt extrusion or based on any other lamination.

To the above melt formable and thermoplastic resin, there may, as required, be added one or two or more kinds of additives such as pigment, antioxidant, antistatic agent, ultraviolet absorber or lubricant in a total amount in a range of 0.001 part to 5.0 parts per 100 parts by weight of the resin, as a matter of course.

In order to reinforce the container, furthermore, there may be blended a fibrous reinforcing material such as glass fiber, aromatic polyamide fiber, carbon fiber, pulp or cotton linter; powdery reinforcing material such as carbon black or white carbon; or flake-like reinforcing material such as glass flakes or aluminum flakes, in one kind or in two or more kinds in a total amount of 2 to 150 parts by weight per 100 parts by weight of the thermoplastic resin. As a filler, further, there may be further added one or two or more kinds of heavy to soft calcium carbonate, mica, talc, kaolin, gypsum, clay, barium sulfate, alumina powder, silica powder and magnesium carbonate in a total amount of 5 to 100 parts by weight per 100 parts by weight of the thermoplastic resin according to a known recipe.

In order to improve the gas-barrier property, further, there may be added scale-like inorganic fine powder, such as water-swelling mica or clay in a total amount of 5 to 100 parts by weight per 100 parts by weight of the thermoplastic resin according to a known recipe.

According to the present invention, the above-mentioned gas-barrier material can be provided on the surface of the final film, sheet or container, or the film thereof can be formed in advance on a pre-formed article that is to be formed into a container. As the pre-formed articles, there can be exemplified a cylindrical parison with or without bottom which is to be biaxially draw-blow formed, a pipe which is to be formed into a plastic can, a sheet to be put to the vacuum forming, compressed air forming, or plug-assisted forming, as well as a heat-sealed closure, and a film for forming bags.

In the packing material of the present invention, it is desired that the gas-barrier material, usually, has a thickness of 0.1 to 10 μm and, particularly, 0.5 to 5 μm. When the thickness is smaller than the above range, the oxygen-barrier property often becomes insufficient. Even when the thickness exceeds the above range, on the other hand, there is not obtained any particular advantage but rather disadvantage is brought about from the standpoint of cost of the packing material. The gas-barrier material can be provided as a single layer on the inner surface of the container, on the outer surface of the container and as an intermediate layer of a laminated body and can, further, be provided as a multiciplicity of layers on the inner and outer surfaces of the container, or on either the inner surface or the outer surface of the container and as the intermediate layer of the laminated body, as a matter of course.

The film-coated pre-formed article can be formed into a final container under the conditions known per se. such as biaxial draw-blow forming or plug-assisted forming. Further, the film or sheet coated with a layer may be stuck to another film or sheet to form a laminated body which is, then, used as a pre-formed article from which heat-sealed closures, pouches and containers are to be formed.

When used as the packing material, at least the one surface of the layer comprising the gas-barrier material may be provided with an anchoring layer. Provision of the anchoring layer enhances the adhesion between the layers to further improve mechanical strength of the container and the flexibility of the laminated body.

When the layer of the gas-barrier material is to be used as the inner and outer surfaces of the container or as the outermost layer of the laminated body, the layer of the gas-barrier material may be formed via the anchor layer. When the layer of the gas-barrier layer is to be formed as the intermediate layer of the laminate, the anchor layer may be formed on at least one surface of the layer of the gas-barrier material.

In the packing material of the present invention, the anchor material can be comprised of various polymers such as those of urethane type, epoxy type, acrylic type and polyester type. It is particularly desired that the packing material of the invention contains an urethane polymer. Further, the anchoring member may be comprised of a chief agent and a curing agent, and may be a precursor in a state where the curing reaction has not been completed, or may be in a state where the curing agent is present in an excess amount. In the case of the urethane type, for example, the anchor member is chiefly constituted by a polyol component such as polyester polyol or polyether polyol, and a polyisocyanate component. The polyisocyanate component may be present in such an amount that the number of the isocyanate groups in the polyisocyanate component is greater than the number of the hydroxyl groups in the polyol component.

It is desired that the thickness of the anchor layer is 0.01 to 10 μm, preferably, 0.05 to 5 μm and, more preferably, 0.1 to 3 μm. When the thickness is smaller than the above range, the effect of the anchor layer does not often contribute to the adhesiveness. When the thickness becomes greater than the above range, on the other hand, no distinguished advantage is obtained but rather disadvantage is brought about from the standpoint of cost of the packing material.

EXAMPLES

The invention will be further described by way of Working Examples to which only, however, the invention is in no way limited.

(Method of Calculating the Acid Value of the Resin)

The acid value stands for the amount in milligrams of potassium hydroxide necessary for neutralizing the free acidic functional groups contained in a gram of a resin. The acid value of the resin was calculated by an ordinary method based on a neutralization titration with an alkali. That is, the resin was dissolved in an ethanol solution and was titrated with a 0.1 N potassium hydroxide standard solution of ethanol by using a 1% phenolphthalein ethanol solution as an indicator.

(Method of Calculating the Acid Value that has Took Part in the Ionic Crosslinking)

The ionic crosslinking was formed by the salt conversion of the carboxyl groups. To measure the acid value that has took part in the ionic crosslinking, there was used a gas-barrier member after the ionic crosslinking, and the measurement was taken by using a Fourier transform infrared spectrophotometer to calculate. Generally, it has been known that the characteristic absorption bands of the carboxylic acid are over the wavelengths of near 920 to 970 cm$^{-1}$, 1700 to 1710 cm$^{-1}$ and 2500 to 3200 cm$^{-1}$ and, further, near 1770 to 1800 cm$^{-}$in the case of an acid anhydride. It has further been known that the characteristic absorption band of a carboxylate is over the wavelengths of near 1480 to 1630 cm$^{-}$. The acid value that has took part in the ionic crosslinking is calculated by using a peak height having vertexes in the wavelength regions of a carboxylic acid and an acid anhydride of 1600 to 1800 cm$^{-1}$ and a peak height having a vertex in the wavelength region of a carboxylate of 1480 to 1630 cm$^{-}$. More desirably, there is used a peak height having vertexes in the wavelength regions of (i) 1695 to 1715 cm$^{-1}$ and (ii) 1540 to 1610 cm$^{-1}$. The infrared absorption spectra of the samples are detected to measure absorbencies over the wavelengths of (i) and (ii) to obtain peak heights. The absorbency coefficients of the carboxylic acid and of the carboxylate are regarded to be the same, and the salt conversion X of the carboxyl groups (ratio of conversion from the carboxylic acid into the carboxylate) was calculated according to the following formula (1), $$X=\text{peak height of }(ii)/[\text{peak height of }(i)+\text{peak height of }(ii)] \quad (1)$$

The peak heights of (i) and (ii) stand for a difference in the absorbency between a peak vertex and the points where the hems of the peaks are overlapped on a base line. The salt conversion of the carboxyl groups found as described above is multiplied by the acid value of the resin found by the method described above, and the acid value that has took part in the ionic crosslinking is calculated according to the following formula (2), i.e., Acid value that has took part in the ionic crosslinking=acid value of resin×salt conversion of the carboxyl groups (2)

When the amount of the acidic functional groups other than the carboxylic acid cannot be neglected, there is used a result determined by a molar concentration at the time of finding the salt conversion.

(Measuring Conditions for the Fourier Transform Infrared Spectrophotometer)

Device used: FTS 7000 Series, manufactured by Digilab Co.

Measuring method: One-time reflection method by using a germanium prism.

Region of measuring wavelengths: 4000 to 700 cm$^{-1}$ (Amount of Oxygen Permeation)

The amounts of oxygen that have permeated through the gas-barrier precursor and the gas-barrier material were measured by using an oxygen permeation measuring instrument (OX-TRAN2/20, manufactured by Modern Control Co.). The measuring conditions were an environmental temperature of 25° C. and a relative humidity of 80%.

Example 1

A 500-mL four neck distillation flask equipped with a stirrer, a thermometer, a refluxing cooling device and a nitrogen introduction pipe, was set in a hot bath of which the temperature was limited. After substituted with nitrogen to a sufficient degree, there were added 63 g of a tetrahydrofuran, 7.0 g of an isopropyl alcohol, 5.6 g (0.10 mol) of acrolein and 64.9 g (0.90 mols) of acrylic acid as a carboxyl group-containing resin thereto, and the temperature was maintained at 30° C. while continuing the substitution with nitrogen for one hour. Thereafter, an azo-type initiator (trade name, V-70, manufactured by Wako Junyaku Co.) was dissolved in an amount of 0.77 g (0.0025 mols) in a required amount of tetrahydrofurane, and was added thereto at one time. The polymerization was continued for 24 hours while maintaining the temperature at 30° C. The tetrahydrofurane was added in a suitable amount to the obtained solution to adjust the viscosity, and a gas-barrier resin solution was obtained. The gas-barrier resin solution was diluted with an ethyl alcohol so that the solid component therein was 20% by weight. Further, a paratoluenesulfonic acid was added such that the amount thereof was 40 mmols with respect to 100 g of the resin to obtain a coating solution.

By using a bar coater, the above coating solution was applied onto a biaxially drawn polyethylene terephthalate film (i) of a thickness of 12 μm. The above film after applied was heat-treated in a gas oven under the conditions of a peak temperature of 170° C. and a peak temperature-holding time of 10 seconds to obtain a polyethylene terephthalate film (iii) shown in FIG. 1 having a coating layer (ii) of a thickness of 2 μm. The above film was immersed in the tap water heated at 50° C. for 3 days. After taken out of the water, the film was dried and was measured for its oxygen permeation amount and acid value.

Example 2

A gas-barrier material was obtained by conducting the treatment in the same manner as in Example 1 but immersing the film for one day in the tap water to which the calcium chloride has been added to adjust the calcium ion concentration to be 2.00 mmols/L.

Example 3

A gas-barrier material was obtained by conducting the treatment in the same manner as in Example 1 but immersing the film in the tap water to which the calcium chloride has been added to adjust the calcium ion concentration to be 3.75 mmols/L.

Example 4

A gas-barrier material was obtained by conducting the treatment in the same manner as in Example 1 but adding a paratoluenesulfonic acid in an amount of 30 mmols with respect to 100 g of the resin, conducting the heat treatment in a gas oven at a peak temperature of 140° C., and immersing the film in the tap water to which the calcium chloride has been added to adjust the calcium ion concentration to be 3.75 mmols/L.

Example 5

A gas-barrier material was obtained by conducting the treatment in the same manner as in Example 1 but immersing the film in the tap water for 8 hours.

Example 6

A gas-barrier material was obtained by conducting the treatment in the same manner as in Example 1 but adding acrolein in an amount of 13.4 g (0.24 mols) and carboxyl group-containing resin in an amount of 54.8 g (0.76 mols), and retorting the film in the tap water heated at 120° C. for 30 minutes.

Example 7

A gas-barrier material was obtained by conducting the treatment in the same manner as in Example 1 but adding acrolein in an amount of 16.8 g (0.30 mols) and carboxyl group-containing resin in an amount of 50.5 g (0.70 mols), and retorting the film in the tap water heated at 120° C. for 30 minutes.

Example 8

A gas-barrier material was obtained by conducting the treatment in the same manner as in Example 1 but immersing the film in the tap water which has been so adjusted as to contain a 1,2-diaminoethane in an amount of 0.33 mmols/L.

Example 9

A gas-barrier material was obtained by conducting the treatment in the same manner as in Example 1 but adding acrolein in an amount of 5.6 g (0.1 mols), methacrylic acid as a carboxyl group-containing resin in an amount of 60.2 g (0.7 mols) and maleic acid in an amount of 23.2 g (0.2 mols), and immersing the film in the tap water to which the calcium chloride has been added to adjust the calcium ion concentration to be 3.75 mmols/L.

Example 10

A solution containing a gas-barrier resin in an amount of 15% by weight as a solid component was obtained by utilizing a TEMPO catalyst (2,2,6,6-tetramethylpiperidine 1-oxyl, manufactured by Tokyo Kasei Co.), by dissolving, in the water, 11.4 g of dextrin (trade name: Amycol No. 7H, manufactured by Nichiden Kagaku Co.) which has been turned into carboxyl groups by selectively oxidizing only primary hydroxyl groups at the C6 position, and by mixing it to 354.4 g of a polyacrylic acid aqueous solution (manufactured by Wako Junyaku Co.) having a solid component of 25% by weight. Further, 7.5 g of a polycarbodiimide resin (trade name: Carbodilite E-01, manufactured by Nisshinbo Co.) having a solid component of 40% by weight was added as a crosslinking agent for crosslinking the carboxyl groups, and was stirred well to obtain a coating solution.

By using a bar coater, the above coating solution was applied to onto a biaxially drawn polyethylene terephthalate film (i) of a thickness of 12 µm. The above film after applied was heat-treated in a gas oven under the conditions of a peak temperature of 140° C. and a peak temperature-holding time of 10 seconds to obtain a polyethylene terephthalate film (iii) having a coating layer (ii) of a thickness of 2 µm. The above film was immersed in the tap water heated at 50° C. for 3 days. After taken out of the water, the film was dried and was measured for its oxygen permeation amount and acid value.

Example 11

A polyacrylic acid (25% aqueous solution, manufactured by Wako Junyaku Co.) was used as a carboxyl group-containing polymer (C), solidified under a reduced pressure, and was dissolved in methanol to obtain a (methanol/water) solution (a) having a solid content of 21.5%. The solvent composition was methanol/water=95.4/4.5 as a weight ratio. As a crosslinking agent (D) among the carboxyl groups, on the other hand, a 2,2'-bis(2-oxazoline) (manufactured by Tokyo Kasei Co.) was dissolved in methanol and was used as a solvent (b) of a solid component of 5%. The solutions (a) and (b) were mixed together such that the crosslinking agent was 10% by weight per the polycarboxylic acid polymer, and methanol was further added thereto such that the solid component was 15%, and the mixture was stirred well to prepare a coating solution.

By using a bar coater, the above coating solution was applied onto a biaxially drawn polyethylene terephthalate film (i) of a thickness of 12 µm. The above film after applied was heat-treated in an electric oven under the conditions of a peak temperature of 140° C. and a peak temperature-holding time of 180 seconds to form a coating layer (ii) of a thickness of 2 µm and to obtain a coating film (iii) as shown in FIG. 1.

The above film (iii) was immersed in the tap water heated at 50° C. for one day. After taken out of the water, the film was dried and was measured for its oxygen permeation amount and acid value.

Example 12

A polyester polyol (Byron 200, manufactured by Toyo Boseki Co.) was dissolved in an ethyl acetate/methyl ethyl ketone mixed solvent (weight ratio of 60/40) in an amount of 20% by weight. Into this solution, there were added a polyisocyanate (Sumijule N3300, manufactured by Sumika Bayern Urethane Co.) and a di-n-butyltin dilaurate (manufactured by Wako Junyaku Co.) in amounts of 60% by weight and 0.8% by weight, respectively, with respect to the polyester polyol, which was, then, diluted with the above mixed solvent so that the whole solid component was 14% by weight to thereby obtain a coating solution for forming an anchor layer.

By using a bar coater, the above coating solution was applied onto a biaxially drawn polyethylene terephthalate film (i) of a thickness of 12 µm, which was, then, heat-treated in an electric oven under the conditions of a peak temperature of 80° C. and a peak temperature-holding time of 10 seconds to obtain a polyethylene terephthalate film having an anchor layer (ix) of a thickness of 0.5 µm.

A polyacrylic acid (AC-10LHP, manufactured by Nihon Junyaku Co.) was used as a carboxyl group-containing polymer (C), and was dissolved in methanol to obtain a solution (c) having a solid component of 15%. To the solution (c) was further added the solution (b) of Example 11 such that the amount thereof was 10% by weight with respect to the carboxyl group-containing polymer (C), and to which methanol was added to prepare a coating solution (d) having a solid component of 8%.

Figure 3:
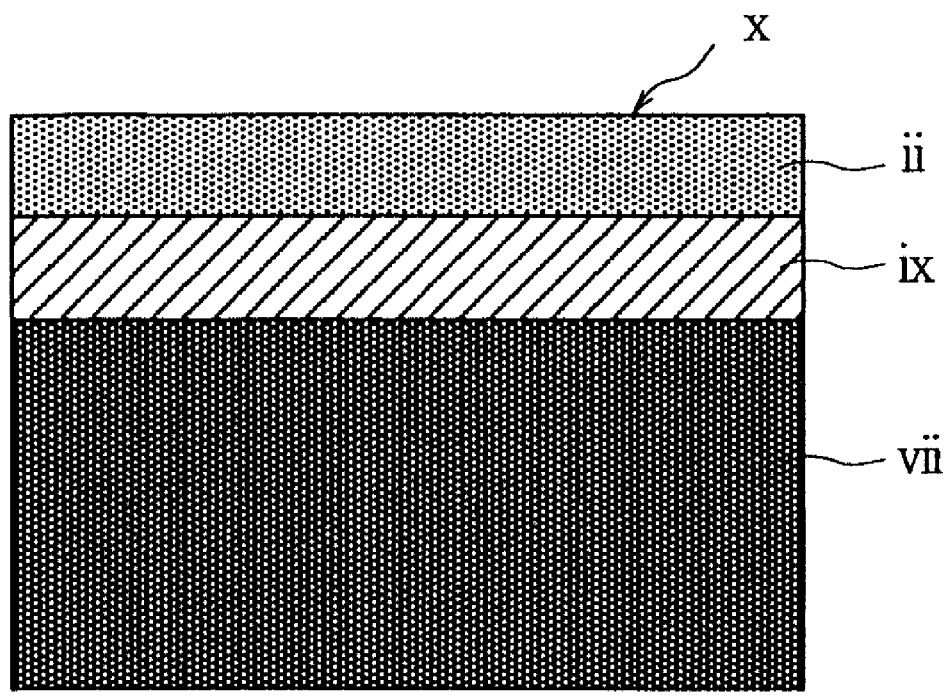
FIG. 3 is a view illustrating, in cross section, a gas-barrier material having an anchor layer produced in Example 12.

By using a bar coater, the coating solution (d) was applied onto a polyethylene terephthalate film having an anchor layer (ix), which was, then, heat-treated in an electric oven under the conditions of a peak temperature of 140° C. and a peak temperature-holding time of 180 seconds to form a coating layer (ii) having 2 µm of thickness and a film area of 450 cm$^2$ thereby to obtain a coating film (x) as shown in FIG. 3.

A gas-barrier material was obtained by immersing the above film (x) for 5 seconds in 1.5 liters of a supernatant solution having a calcium ion concentration of 94 mmols/L by adding calcium chloride to the tap water and the pH of the supernatant solution was adjusted to be 12.76 by using calcium hydroxide and sodium hydroxide, the supernatant solution being maintained at 82° C.

The metal ion concentration was determined by using an inductively coupled plasma emission analyzer (ICAP-88, manufactured by Nippon Jarell Ash Co.).

Example 13

A gas-barrier material was obtained by conducting the treatment in the same manner as in Example 12 but immersing the above film (x) in a supernatant solution having a pH of 12.33 and a calcium ion concentration of 469 mmols/L at a solution temperature of 35° C. for 10 seconds.

Example 14

A gas-barrier material was obtained by conducting the treatment in the same manner as in Example 12 but immersing the above film (x) in a supernatant solution having a pH of 11.21 and a calcium ion concentration of 1875 mmols/L at a solution temperature of 94° C. for 10 seconds.

Example 15

A gas-barrier material was obtained by conducting the treatment in the same manner as in Example 12 but adding the solution (b) to the solution (c) in a manner that the amount thereof was 15% by weight with respect to the carboxyl group-containing polymer (C), adding methanol thereto to obtain a coating solution (d) having a solid component of 8%, and immersing the above film (x) in a supernatant solution having a pH of 11.82 and a calcium ion concentration of 469 mmols/L at a solution temperature of 50° C. for 5 seconds.

Example 16

A gas-barrier material was obtained by conducting the treatment in the same manner as in Example 12 but adding magnesium chloride hexahydrate to the tap water such that the magnesium ion concentration was 180 mmols/L and immersing the above film (x) in a supernatant solution having a pH adjusted to be 10.26 by using sodium hydroxide at a solution temperature of 96° C. for 10 seconds.

Calcium ions are contained in the tap water which is a diluted solution in an amount of 0.60 mmols, which amount, however, is not enough for exhibiting the effect in a period of time of as short as 10 seconds. In this Example, therefore, the effect stems from magnesium ions.

Example 17

Figure 2:
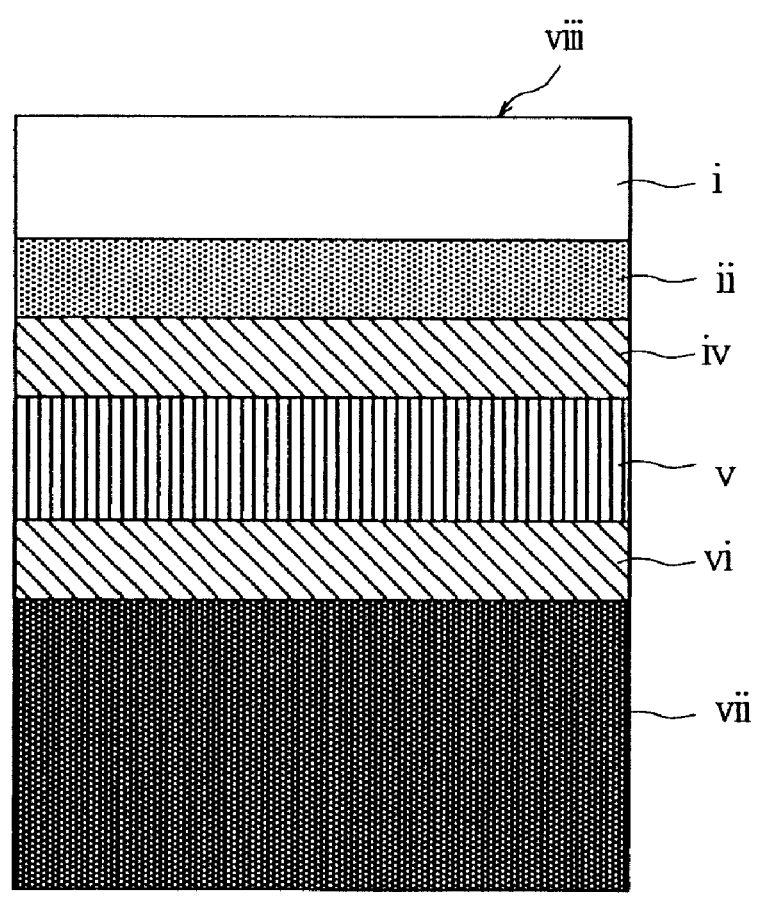
FIG. 2 is a view illustrating, in cross section, a laminated body produced in Example 17.

In Example 1, the coating layer (ii) was used as the underlayer, and on which were successively laminated an urethane adhesive (iv) of a thickness of 2 μm, a biaxially drawn nylon film (v) of a thickness of 15 μm, an urethane adhesive (vi) of a thickness of 2 μm and an undrawn polypropylene film (vii) of a thickness of 70 μm to obtain a laminated body (viii) of a stratified constitution as shown in FIG. 2.

Example 18

A laminated body was obtained in the same manner as in Example 17 but using the coating layer of Example 11.

Comparative Example 1

A gas-barrier material was obtained by conducting the treatment in the same manner as in Example 1 but adding acrolein in an amount of 19.6 g (0.35 mols) and carboxyl group-containing resin in an amount of 46.9 g (0.65 mols), and retorting the film in the tap water heated at 120° C. for 30 minutes.

Comparative Example 2

A gas-barrier material was obtained by conducting the treatment in the same manner as in Example 1 but immersing the film in the tap water for 6 hours.

Comparative Example 3

A gas-barrier material was obtained by conducting the treatment in the same manner as in Example 11 but immersing the film in the tap water for 35 minutes.

Comparative Example 4

A gas-barrier material was obtained by conducting the treatment in the same manner as in Example 1 but further adding calcium chloride to the coating solution so that the amount thereof was 20 mmols per 100 g of the resin and without conducting the immersion treatment.

Comparative Example 5

A gas-barrier material was obtained by conducting the treatment in the same manner as in Example 12 but immersing the film (x) in a supernatant solution of a pH of 9.52 and a calcium ion concentration of 469 mmols/L at a solution temperature of 80° C. for 10 seconds.

Comparative Example 6

A gas-barrier material was obtained by conducting the treatment in the same manner as in Example 12 but immersing the film (x) in a supernatant solution of a pH of 11.07 and a calcium ion concentration of 47 mmols/L at a solution temperature of 60° C. for 10 seconds.

Comparative Example 7

A gas-barrier material was obtained by conducting the treatment in the same manner as in Example 12 but immersing the film (x) in a supernatant solution of a pH of 13.50 and a calcium ion concentration of 469 mmols/L at a solution temperature of 80° C. for 10 seconds.

Comparative Example 8

A gas-barrier material was obtained by conducting the treatment in the same manner as in Example 12 but immersing the film (x) in a supernatant solution of a pH of 11.01 and a calcium ion concentration of 2345 mmols/L at a solution temperature of 80° C. for 10 seconds.

Comparative Example 9

A gas-barrier material was obtained by conducting the treatment in the same manner as in Example 12 but immersing the film (x) in a supernatant solution of a pH of 11.18 and a calcium ion concentration of 94 mmols/L at a solution temperature of 30° C. for 10 seconds.

Table 1 shows the measured results of acid values of the resins, amounts of acid catalysts, conditions for immersion treatment, acid values that have took part in the ionic crosslinking and amounts of oxygen permeation obtained in the above Examples and Comparative Examples.

TABLE 1

| | Acid value of resin (mgKOH/g) | O² permeation before ionic crosslinking (cc/m²/day/atm) | Acid catalyst (mmol) *1 | Immersion conditions | | | | After ionic crosslinking | |
|---|---|---|---|---|---|---|---|---|---|
| | | | | Treating water temp. (° C.) | Ca in treating water (mmol/L) *4 | pH of treating water (pH) *9 | Treating time | Acid value took part in ionic crosslinking (mgKOH/g) | Amount of O₂ permeation (cc/m²/day/atm) |
| Ex. 1 | 717 | 97 | 40 | 50 | 0.60 | 7.30 | 72 hr | 398 | 9 |
| Ex. 2 | 717 | 97 | 40 | 50 | 2.00 | 7.30 | 24 hr | 652 | 3 |
| Ex. 3 | 717 | 97 | 40 | 50 | 3.75 | 7.30 | 72 hr | 673 | 2 |
| Ex. 4 | 717 | 99 | 30 | 50 | 3.75 | 7.30 | 72 hr | 688 | 0.8 |
| Ex. 5 | 717 | 97 | 40 | 50 | 0.60 | 7.30 | 8 hr | 340 | 19 |
| Ex. 6 | 652 | 96 | 40 | 50 | 0.60 | 7.30 | 72 hr | 601 | 9 |
| Ex. 7 | 584 | 95 | 40 | *2 | 0.60 | 7.30 | *2 | 560 | 18 |
| Ex. 8 | 717 | 97 | 40 | 50 | 0.60 *3 | 7.30 | 72 hr | 551 | 8 |
| Ex. 9 | 693 | 96 | 40 | 50 | 3.75 | 7.30 | 72 hr | 630 | 5 |
| Ex. 10 | 727 | 97 | — | 50 | 0.60 | 7.30 | 72 hr | 387 | 12 |
| Ex. 11 | 738 | 97 | — | 50 | 0.60 | 7.30 | 24 hr | 679 | 0.2 |
| Ex. 12 | 738 | 97 | — | 82 | 94 | 12.76 | 5 sec | 686 | 2.0 |
| Ex. 13 | 738 | 97 | — | 35 | 469 | 12.33 | 10 sec | 720 | 0.6 |
| Ex. 14 | 738 | 97 | — | 94 | 1875 | 11.21 | 10 sec | 337 | 1.9 |
| Ex. 15 | 699 | 97 | — | 50 | 469 | 11.82 | 5 sec | 380 | 2.9 |
| Ex. 16 | 738 | 97 | — | 96 | 0.60 (Mg180) *7 | 10.26 | 10 sec | 333 | 2.2 |
| Ex. 17 | 717 | 30 *6 | 40 | 50 | 0.60 | 7.30 | 72 hr | 398 | 0.2 *6 |
| Ex. 18 | 738 | 30 *6 | — | 50 | 0.60 | 7.30 | 24 hr | 694 | 0.2 *6 |
| Comp. Ex. 1 | 549 | 95 | 40 | *2 | 0.60 | 7.30 | *2 | 516 | 32 |
| Comp. Ex. 2 | 717 | 97 | 40 | 50 | 0.60 | 7.30 | 6 hr | 302 | 41 |
| Comp. Ex. 3 | 738 | 97 | — | 50 | 0.60 | 7.30 | 0.6 hr | 241 | 28 |
| Comp. Ex. 4 *5 | 717 | 94 | 40 | — | — | — | — | 20 | 94 |
| Comp. Ex. 5 | 738 | 97 | — | 80 | 469 | 9.52 | 10 sec | 92 | 90 |
| Comp. Ex. 6 | 738 | 97 | — | 60 | 47 | 11.07 | 10 sec | 79 | 95 |
| Comp. Ex. 7 | 738 | 97 | — | 80 | 469 | 13.50 | 10 sec | *8 | *8 |
| Comp. Ex. 8 | 738 | 97 | — | 80 | 2345 | 11.01 | 10 sec | 185 | 60 |
| Comp. Ex. 9 | 738 | 97 | — | 30 | 94 | 11.18 | 10 sec | 111 | 88 |
| PET material | — | 120 | — | — | — | — | — | — | — |

*1: Amount of paratoluenesulfonic acid per 100 g of resin.
*2: Retort treatment in tap water of 120° C. for 30 minutes.
*3: 1.2-Diaminoethane is added to tap water to be 0.33 mmols/L.
*4: Ca is present in the treating water in an amount necessary and sufficient for metal ionically corsslinking all carboxyl groups in the resin.
*5: Ca is added to the coating solution but the immersion treatment is not conducted.
*6: Amount of permeation of oxygen through the laminated body.
*7: Treating water containing 0.60 mmols of Ca and 180 mmols of Mg. The content of Ca is the one naturally contained in the tap water.
*8: Film defoliates due to the inmersion treatment.
*9: pH was measured at room temperature (21° C.).

The invention claimed is:

1. A gas-barrier material in which carboxyl groups are ionically crosslinked in an amount corresponding to an acid value of at least 330 mgKOH/g of a resin that has the carboxyl groups in an amount corresponding to an acid value of not smaller than 580 mgKOH/g, wherein said resin comprises a copolymer of a carboxyl group-containing vinyl monomer (A) and a vinyl monomer (B) having aldehyde or glycidyl functional groups which are capable of reacting with themselves or with the carboxyl groups, as essential components.

2. A gas-barrier material according to claim 1, wherein said carboxyl groups are crosslinked with polyvalent metal ions.

3. A gas-barrier material according to claim 1, wherein said functional groups in said vinyl monomer (B) react with themselves or with the carboxyl groups to form a crosslinked structure.

4. A gas-barrier material in which carboxyl groups are conically crosslinked in an amount corresponding to an acid value of at least 330 mgKOH/g of a resin that has the carboxyl groups in an amount corresponding to an acid value of not smaller than 580 mgKOH/g, wherein said resin comprises a carboxyl group-containing polymer (C) and a compound (D) containing two but no more than two ring structures (d) in which an ether bond is formed with carbon that forms a double bond with nitrogen, the ring structures (d) containing oxygen of the ether bond, and a crosslinked structure is formed by the reaction of the carboxyl groups of said carboxyl group-containing polymer (C) with the ring structures (d) of said compound (D).

5. A gas-barrier material according to claim 4, wherein at least one of the ring structures (d) contained in said compound (D) is an oxazoline group or a derivative thereof.

6. A gas-barrier material according to claim 4, wherein said compound (D) is a 2,2'-bis (2-oxazoline).

7. A method of producing a gas-barrier material by in which carboxyl groups are ionically crosslinked in an amount corresponding to an acid value of at least 330 mgKOH/g of a resin that has the carboxyl groups in an amount corresponding to an acid value of not smaller than 580 mgKOH/g, wherein said resin comprises a copolymer of a carboxyl group-containing vinyl monomer (A) and a vinyl monomer (B) having aldehyde or glycidyl functional groups which are capable of reacting with themselves or with the carboxyl groups, as essential components, said method comprises treating a gas-barrier precursor of a resin that has carboxyl groups in an amount corresponding to an acid value of not smaller than 580 mgKOH/g with the water of a pH of 10 to 13 containing a polyvalent metal compound in an amount of 90 to 2000 mmols/L calculated as metal atoms at a temperature of not lower than 35° C. for not longer than 10 seconds thereby to form a metal ion-crosslinked structure among the unreacted carboxyl groups in an amount corresponding to an acid value of at least 330 mgKOH/g.

8. A method of producing a gas-barrier material according to claim 7, wherein said treatment comprises immersing the gas-barrier precursor in the water containing a polyvalent metal.

9. A packing material having a layer of the gas-barrier material of claim 1 on the surfaces of a plastic base material or between the plastic layers.

* * * * *